United States Patent [19]

Roscoe et al.

[11] Patent Number: 5,081,351

[45] Date of Patent: Jan. 14, 1992

[54] METHOD AND APPARATUS FOR BOREHOLE CORRECTION IN CAPTURE GAMMA RAY SPECTROSCOPY MEASUREMENTS

[75] Inventors: Bradley A. Roscoe, Pasadena; Christian Stoller, Kingwood, both of Tex.

[73] Assignee: Schlumberger Technology Corporation, Houston, Tex.

[21] Appl. No.: 606,221

[22] Filed: Oct. 31, 1990

[51] Int. Cl.$^5$ .............................................. G01V 5/10
[52] U.S. Cl. .................................. 250/270; 250/265; 250/266
[58] Field of Search ............... 250/256, 257, 258, 265, 250/266, 270, 264

[56] References Cited

U.S. PATENT DOCUMENTS

| | | | |
|---|---|---|---|
| 3,521,064 | 7/1970 | Moran et al. | 250/261 |
| 3,818,225 | 6/1974 | Smith | 250/264 |
| 3,864,569 | 2/1975 | Tittman | 250/264 |
| 4,317,993 | 3/1982 | Hertzog, Jr. et al. | 250/270 |
| 4,327,290 | 4/1982 | Plasek | 250/262 |
| 4,423,323 | 12/1983 | Ellis et al. | 250/264 |
| 4,464,569 | 8/1984 | Flaum | 250/270 |
| 4,507,554 | 3/1985 | Hertzog et al. | 250/270 |
| 4,656,354 | 4/1987 | Randall | 250/256 |
| 4,661,701 | 4/1987 | Grau | 250/270 |
| 4,721,853 | 1/1988 | Wraight | 250/269 |
| 4,788,424 | 11/1988 | Preeg | 250/270 |
| 4,810,876 | 3/1989 | Wraight et al. | 250/256 |
| 4,816,674 | 3/1989 | Ellis et al. | 250/256 |
| 4,926,044 | 5/1990 | Wraight | 250/264 |
| 4,937,446 | 6/1990 | McKeon et al. | 250/270 |

OTHER PUBLICATIONS

"Geochemical Logging with Spectrometry Tools", by R. Hertzog et al., presented at the 62nd Annual Technical Conference and Exhibition of the Petroleum Engineers held in Dallas, Tex. on Sep. 27-30, 1987, paper SPE #16792.

"Response of the Carbon/Oxygen Measurement for an Inelastic Gamma Ray Spectroscopy Tool", by B. A. Roscoe and J. A. Grau, SPE Formation Evaluation, pp. 76-80, Mar. 1988.

Primary Examiner—Constantine Hannaher
Attorney, Agent, or Firm—Henry N. Garrana; Frederic C. Wagret

[57] ABSTRACT

A method and an apparatus for correcting nuclear measurements performed in a borehole traversing earth formation, for the effect of said borehole, wherein the formation is irradiated with high energy neutrons source and the gamma rays resulting from the capture of neutrons with atoms of the formation and the borehole are detected and processed so as to generate two energy spectra representative of gamma rays coming from two respective zones radially spaced from the neutron source; from each spectrum is derived a response of atoms of a same element located at the respective zones, a first response being mainly representative of the borehole and a second response being mainly representative of the formation; from a predetermined relationship between the responses and from calibration a corrective factor for borehole effects is obtained.

Each response comprises the elemental yield of a single element, such as hydrogen for porosity measurements, or chlorine for salinity measurements, or iron for lithology measurements. Elemental yields are derived from gamma rays either detected at two time gates following each a burst, or by using two different detectors longitudinally spaced from said neutron source.

32 Claims, 4 Drawing Sheets

○ 7" CASING
△ 7.6" CASING

METHOD AND APPARATUS FOR BOREHOLE CORRECTION IN CAPTURE GAMMA RAY SPECTROSCOPY MEASUREMENTS

BACKGROUND OF THE INVENTION

1 - Field of the Invention

This invention relates to nuclear measurements involving the spectroscopic analysis of energy spectra of gamma rays resulting from the interaction of neutrons with atoms of elements constituting an unknown material. The invention can find application in nuclear well logging techniques, wherein a sonde is lowered in a well (or borehole) and carries out spectral measurements from which is derived information about the composition of the earth formation surrounding the borehole, or the borehole fluid, or the annulus including casing and cement located between the borehole wall and the formation.

2 - Related Art

A major goal of well logging is to obtain quantitative and qualitative information related to hydrocarbons in earth formation surrounding a well. A substantial part of nuclear well logging techniques are based on spectral analysis of energy spectra of gamma rays resulting from interactions of atoms with neutrons emitted from the sonde, such gamma rays being representative of certain atoms of the lithology (i.e. the matrix or the formation fluid) or of the borehole. Any reference hereafter made to "formation" or "lithology" has to be construed as referring to formation and/or formation fluid.

For example, the energy spectrum of gamma rays resulting from the capture of thermal neutrons, after being decomposed into contributions due to individual atomic elements, usually called "elemental yields", reveals information concerning the presence of earth formation elements such as e.g. hydrogen, silicon, calcium, chlorine, sulfur and iron. Important petrophysical parameters such as porosity, matrix lithology and water salinity may be derived from the elemental yields. Examples of capture gamma ray spectra analysis are depicted in U.S. Pat. Nos. 3,521,064 to Moran et al., 4,464,569 to Flaum, 4,507,554 to Hertzog and Nelligan, 4,661,701 to Grau, 4,810,876 to Wraight et al.; U.S. Pat. No. 4,937,446 to Roscoe, Stoller and McKeon shows an inelastic gamma ray spectral analysis. All the above mentioned patents are assigned to the assignee of the present application, and are as well incorporated herein by reference. In accordance with the teaching of the above identified Moran Patent, a measured gamma ray energy spectrum, representative of a formation of unknown composition, is compared with a composite spectrum constructed from individual laboratory derived standard spectra of the constituents postulated to comprise the formation. The different amounts of the standard spectra (elemental yields) which give the best fit to the measured spectrum when weighted by each element sensitivity (i.e. the ability of an element to emit gamma rays and be detected) represent the relative proportion of the constituents of the formation. By appropriate selection of the standards, the proportion of the constituents of interest can be obtained and the desired information regarding hydrocarbon content or lithology may be derived.

Capture gamma rays could also be used for determining the porosity of the formation, by using so called "neutron logs" which respond primarily to the amount of hydrogen in the formation. Thus, in clean formations whose pores are filled with water or oil, the neutron log reflects the amount of liquid-filled porosity. Neutrons are electrically neutral particles, each having a mass almost identical to the mass of a hydrogen atom. High-energy (fast) neutrons are continuously emitted from a radioactive source in the sonde. These neutrons collide with nuclei of the formation materials in what may be thought of as elastic "billiard-ball" collisions. With each collision, the neutron loses some of its energy. The amount of energy lost per collision depends on the relative mass of the nucleus with which the neutron collides. The greater energy loss occurs when the neutron strikes a nucleus of practically equal mass—i.e., a hydrogen nucleus. Collisions with heavy nuclei do not slow the neutron very much. Thus, the slowing of neutrons depends largely on the amount of hydrogen in the formation. Within a few microseconds the neutrons have been slowed by successive collisions to thermal velocities, corresponding to energies of around 0.025 eV. They then diffuse randomly, without losing more energy, until they are captured by the nuclei of atoms such as chlorine, hydrogen, or silicon. The capturing nucleus becomes intensely excited and emits a high-energy capture gamma ray. Depending on the type of neutron tool, either these capture gamma rays or the neutrons themselves are counted by a detector in the sonde. When the hydrogen concentration of the material surrounding the neutron source is large, most of the neutrons are slowed and captured within a short distance of the source. On the contrary, if the hydrogen concentration is small, the neutrons travel farther from the source before being captured. Accordingly, the counting rate at the detector increases for decreased hydrogen concentration, and vice versa. Examples of implementation of such method can be found in U.S. Pat. No. 4,816,674 to Ellis et al. or 4,423,323 to Ellis et al. both assigned to the assignee of the present application.

Atoms of the formation or the borehole could also be hit by neutrons in an interaction called "inelastic" wherein inelastic gamma rays are emitted. U.S. Pat. No. 4,507,554 to Hertzog and Nelligan, assigned to the assignee of this application, discloses a method of determining the composition of the borehole material in which an inelastic spectrum is recorded during the neutron burst and two capture spectra are obtained in respective time periods following the burst; one shortly after the burst and a second a much longer time after. The recorded spectra are analyzed as described above using sets of standard spectra specific to each time period. It is assumed that the earlier of the two capture spectra contains information about both the borehole and the formation, whereas the later capture spectrum contains information only, or at least primarily, about the formation. Accordingly, the difference between the constituent analyses derived from the capture spectra is taken to indicate the composition of the borehole. This technique has the disadvantage that the time period between successive neutron bursts may be relatively long, to allow the radiation emanating from the borehole constituents to subside sufficiently before the second capture spectrum is recorded. Consequently the logging speed must be relatively low, or alternatively poor depth resolution of the logs must be accepted. In addition, the assumption of little or no borehole contribution to the second capture spectrum is only an approximation, and thus does not necessarily reflect the real environment in which the spectral measurements are made.

It has been also proposed, as described in U.S. Pat. No. 4,788,424 assigned to the assignee of the present application, a method for producing an indication of the partition between a borehole and a formation of the constituents identified by means of a nuclear investigation. Capture gamma rays are detected and counted according to energy in each of two time gates. The resulting energy spectra are analyzed to determine the type and relative gamma ray yield of each constituent of the borehole and formation. A characteristic neutron capture decay time constant for each constituent is derived from the yields and total gamma ray counts in the two time gates, and time constants for the borehole and formation overall are set equal to the derived time constants for constituents, such as iron and silicon, occurring predominantly in the borehole and formation respectively. The partition of the remaining constituents is then determined by considering the characteristic time constant for each constituent to be the sum of the time constants for the borehole and formation regions weighted by the proportion of that constituent in each region, the borehole and formation time constants being assumed the same for all constituents and the sum of the proportions being unity.

Furthermore, examples of determination of lithology are depicted e.g. in U.S. Pat. No. 4,810,876 to Wraight et al., or in the U.S. patent application Ser. No. 476,223, filed on Feb 7, 1990, in the name of B. A. Roscoe and J. A. Grau, for a "Geochemical logging apparatus and method for determining concentrations of formation elements next to a borehole", both assigned to the assignee of the present application, or in the article entitled "Geochemical Logging with Spectrometry Tools" by R. Hertzog et al., presented at the 62nd Annual Technical Conference and Exhibition of the SPE, held in Dallas, Tex., on Sept. 27-30, 1987. Both the '876 patent and the SPE paper are herein incorporated by reference.

In order to penetrate the subterranean formation the fast neutrons must pass through the fluid contents of the borehole before entering the formation. The resulting borehole contributions to the inelastic and capture gamma ray spectra significantly complicate the analysis of the formation composition. One way of accounting for these contributions is to calibrate the logging tool in a reference borehole having known borehole contents and formation compositions. However, this requires large number of calibration measurements. Also laboratory conditions do not necessarily reflect the real composition of the contents of the borehole, so inaccuracies can result in the constituent proportions obtained from the spectra matching process. Taking more accurate account of the composition of an individual borehole's contents would enable more accurate information to be obtained concerning the constituents of the earth formations surrounding a borehole. Although the composition of the contents of the borehole may be determined with other logging tools, the use of the logs from such tools to correct the spectral analysis results requires accurate recording of the measurements and of the corresponding positions along the borehole. Separate borehole passes may be required for each measurement, contributing further to errors which arise from merging the data to assure depth correspondence. Each additional log requires additional expense and delay and contributes further errors.

A method for correcting for the borehole effect in inelastic gamma ray spectroscopy has been described in SPE paper "Response of the Carbon/Oxygen Measurements for an Inelastic Gamma Ray Spectroscopy Tool" by B. A. Roscoe & J. A. Grau, presented at the 1985 SPE Annual Technical Conference and Exhibit held in Las Vegas, Sept. 22-25, 1985. The depicted method aims at determining the parameters upon which depends the carbon-to-oxygen ratio and is based on the assumption that porosity and lithology are both known.

Although the above mentioned correction methods have proven to be useful, there is still a need for improvements towards a better knowledge of the borehole effects on the measurements the ultimate goal of which is to determine the characteristics of the formation, such as porosity, salinity or lithology.

OBJECT OF THE INVENTION

A principal object of this invention is to provide a reliable and efficient method for correcting for the effects of the borehole on the detection of capture gamma rays resulting from the bombardment with high energy neutrons of the formation surrounding the borehole, for e.g. porosity, salinity or lithology measurements.

SUMMARY OF THE INVENTION

According to the invention, these and further objects are attained by a method for correcting nuclear measurements generated from the detection of gamma rays resulting from the interactions of neutrons with atoms of earth formation traversed by a borehole, for the effect of the borehole, comprising:

irradiating the formation with neutrons from a high energy neutron source;

detecting and counting the gamma rays resulting from the capture of the neutrons by atoms of the formation and borehole;

forming at least two energy spectra representative of gamma rays coming from at least two respective zones radially spaced from the source;

deriving from each spectrum a response of atoms of a same element located at the respective zones, a first response being mainly representative of the borehole and a second response being mainly representative of the formation;

establishing a predetermined relationship between the responses; and deriving from the relationship and from the calibration data, a corrective factor for borehole effects to be applied to the measurements.

Preferably, each of the responses comprises the elemental yield of a single element, such as hydrogen for porosity measurements, or chlorine for salinity measurements, or iron for lithology measurements.

According to a preferred embodiment, the responses are derived from gamma rays detected in different time gates each following a neutron burst.

Alternately, the responses are derived from gamma rays detected at different detecting locations longitudinally spaced from the neutron source.

According to another aspect of the invention, it is proposed a method for determining a characteristic or parameter of earth formation traversed by a borehole, corrected for the effect of said borehole, comprising:

irradiating said formation with neutrons from a high energy neutron source;

detecting and counting the gamma rays resulting from the capture of said neutrons by atoms of said formation and borehole;

forming at least two energy spectra representative of gamma rays coming from at least two respective zones radially spaced from said source;

deriving from each spectrum a response of atoms of a same element located at said respective zones, a first response being mainly representative of the borehole and a second response being mainly representative of the formation;

combining according to a predetermined relationship said responses;

establishing from pre-existing calibration data a chart showing the variation of said relationship versus said characteristic to be measured; and deriving from said relationship and from said chart, said characteristic, as corrected for the effect of said borehole.

Such characteristic or parameter, as hereabove referred to, could be e.g. porosity, salinity or lithology.

The invention also contemplates an apparatus for implementing the method hereabove set forth.

The characteristics and advantages of the invention will appear better from the description to follow, given by way of a nonlimiting example, with reference to the appended drawings in which:

DETAILED DESCRIPTION

Figure 1:
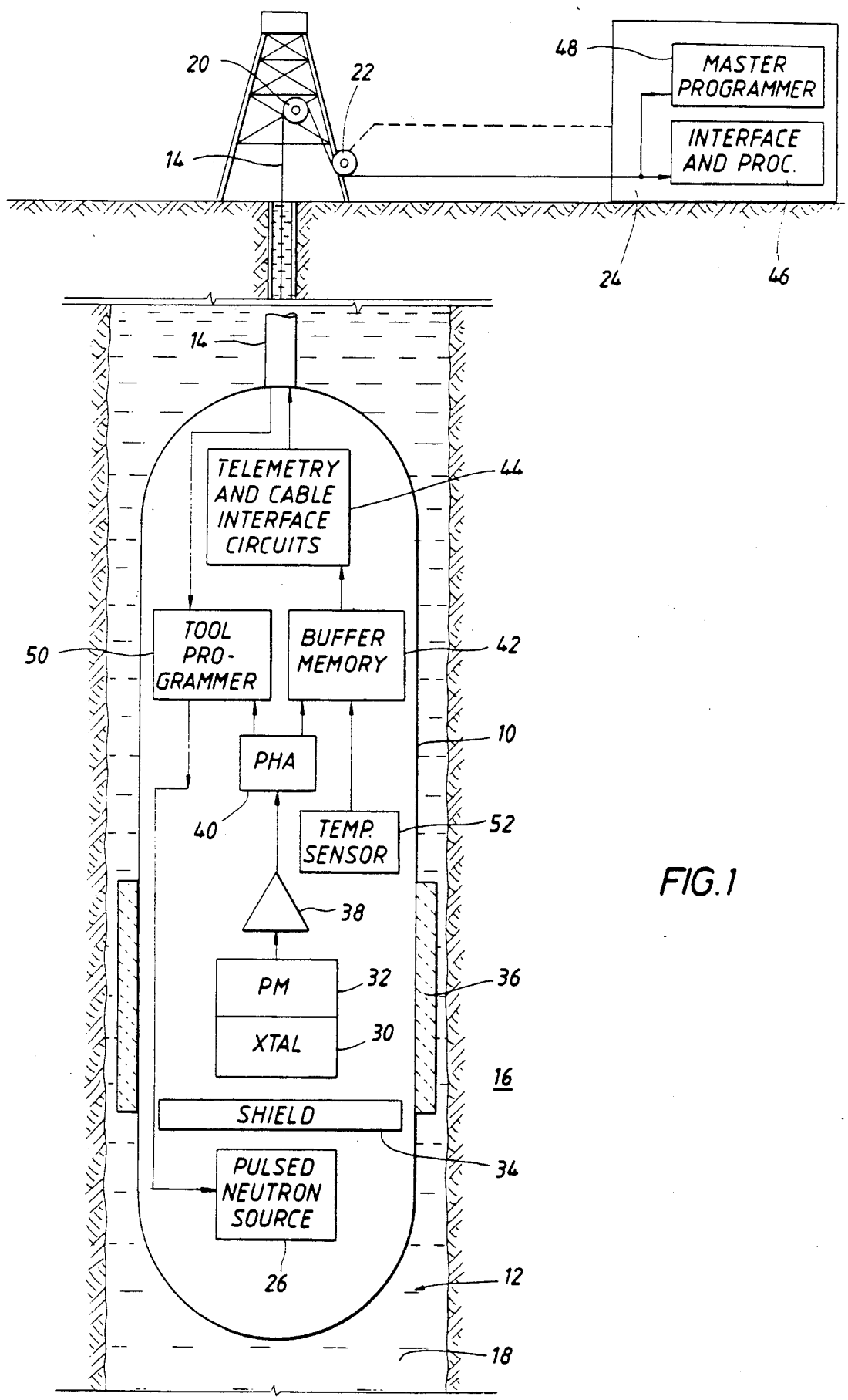
FIG. 1 is a schematic view of a first embodiment of a logging apparatus that may be utilized in the practice of the invention.

Referring to the drawings, FIG. 1 shows a sonde 10 suspended in a borehole 12 on an armored multi-conductor cable 14. The borehole 12 traverses a formation 16 and is filled with fluid 18, and may be open, as shown, or cased. The sonde 10 as described below may be constructed in accordance with U.S. Pat. Nos. 4,390,783 to Grau, or 4,788,424 to Preeg, both assigned to the assignee of the present application and both herein incorporated by reference. Other sondes suitable for use in implementing the present invention will occur to those skilled in the art. The sonde 10 is moved in the borehole 12 by paying the cable 14 out and (while the logging measurements are actually being made) reeling it back in over a sheave wheel 20 and a depth gauge 22 by means of a winch forming part of a surface equipment 24.

The sonde 10 includes a neutron source 26 for producing primary radiation to bombard the formation 16 with fast neutrons as the sonde 10 travels up the borehole 12, and a radiation detector 28 for detecting gamma rays induced thereby in the borehole 12 and the formation 16. The neutron source 26 is, in the example of FIG. 1, of the pulsed type, such as described e.g. in U.S. Pat. Nos. 3,461,291 to Goodman and 3,546,512 to Frentrop, both commonly owned with this application and hereby incorporated by reference. This type of source is particularly suited to the generation of discrete bursts of high energy or fast neutrons, e.g. at 14 MeV, with a controlled duration and repetition rate.

The detector 28 may be of any type appropriate to the detection of gamma radiation and the production of an electrical signal corresponding to each detected gamma ray and having an amplitude representative of the energy of the gamma ray. Typically the detector 28 includes a scintillation crystal 30 which is optically coupled to a photomultiplier 32. The crystal may be of the thallium-activated sodium iodide type, although any other suitable crystal such as thallium or sodium activated cesium iodide or bismuth germanate, for example, may be used. Alternatively a solid-state detector, having a germanium crystal for example, may be used to produce the required signal directly and with sharp energy resolution. In this case, the sonde 10 may be modified to maintain the detector at a suitably low temperature for correct operation, using for example the cryostat described in U.S. Pat. No. 4,315,417 to Zarudiansky.

A neutron shield 34 can be placed between the source 26 and the detector 28 to limit direct bombardment of the detector 28 by neutrons from the source 26. The sonde 10 may be surrounded by a boron carbide impregnated sleeve 36 in the general location of the source 26 and the detector 28. This sleeve acts as a neutron absorber for attenuating over time neutron interactions which occur in the immediate vicinity of the source 26 and the detector 28 (that is, in the borehole 12) and which produce detectable gamma rays.

Electrical power for the sonde 10 is supplied via the cable 14 from the surface equipment 24. The sonde 10 includes power conditioning circuitry (not shown) for feeding power at appropriate voltage and current levels to the source 26, the detector 28 and other downhole circuits. These circuits include an amplifier 38 which receives the output pulses from the photomultiplier 32. The amplified pulses are then applied to a pulse height analyzer (PHA) 40 which may be of any conventional type such as the single ramp (Wilkinson rundown) type. Other suitable pulse height analog to digital converters may be used for the gamma ray energy to be analyzed. Linear gating circuits may also be employed for control of the time portion of the detector signal frame to be analyzed. Improved performance can be obtained by the use of additional conventional techniques such as pulse pile-up rejection.

Figure 3:
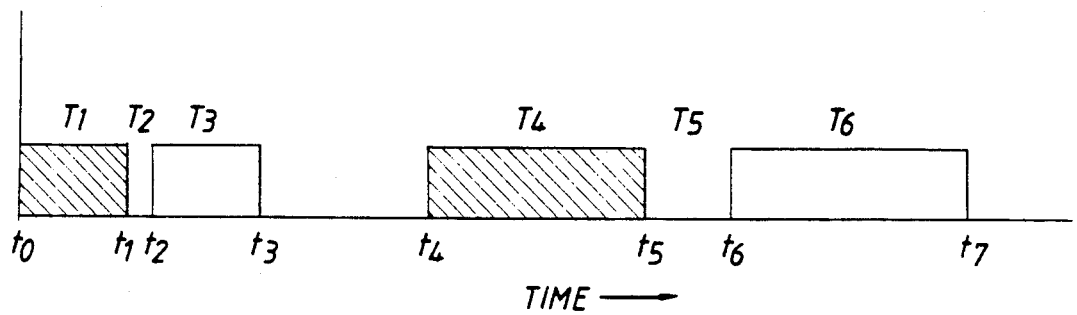
FIG. 3 is a schematic graph showing the sequence in time of irradiation and detection as performed by the apparatus of FIG. 1.

Pulse height analyzer 40 assigns each detector pulse to one of a number (typically in the range 256 to 8000) of predetermined channels according to its amplitude (i.e. the gamma ray energy), and supplies a signal in suitable digital form representing the channel or amplitude of each analyzed pulse. The occurrences of each channel number in the digital output of pulse height analyzer 40 are accumulated in a buffer memory 42 to provide an energy spectrum, which is then transferred to telemetry and cable interface circuits 44 for transmission over the cable 14 to the surface equipment 24. Buffer memory 42 is arranged to accumulate spectral counts during several separate portions or time gates starting with each burst of neutrons from the neutron source 26. This is illustrated in FIG. 3 which is a diagrammatic representation of the time distribution of gamma rays resulting from the irradiation of an earth formation with bursts of fast neutrons. Thus, in the illustrated embodiment, a first time gate $T_1$ is coincident with a first neutron burst (indicated by the hatched area) and lasts from $t_0$ to $t_1$, during which a spectrum of gamma radiation arising from inelastic interactions between neutrons and nuclei is acquired. A second time gate $T_2$, starting at $t_1$ and ending at $t_2$, allows the inelastic radiation to subside before a first spectrum of gamma radiation arising from neutron capture is acquired in a third time gate $T_3$ lasting from $t_2$ to $t_3$. A second neutron burst is emitted during a fourth time gate $T_4$ lasting from $t_4$ to $t_5$. After a fifth time gate $T_5$ lasting from $t_5$ to $t_6$, a second spectrum of capture gamma rays is acquired during a sixth time gate $T_6$ between $t_6$ and $t_7$.

Thereafter, the cycle including the above referred to six time gates, and which might be called "microcycle", is repeated e.g. for 1 ms. Then, the source 26 is turned off and background measurements are performed for about 15-20 ms; the micro-cycle followed by the background time gate constitutes what may be called a "macro-cycle". Finally, the whole macro-cycle is itself repeated several times, for e.g. a few seconds.

The first and second neutron bursts may be either of equal or of different durations; typically $T_1$ is comprised between 5 and 60 ms and $T_4$ is comprised between 5 and 500 ms. Also, $T_2$ may last a few ms while $T_5$ may last between 5 ms and 400 ms.

At the surface, the cable signals are received by cable interface and signal processing circuits 46. It will be understood that the circuits 44 and 46 may be of any suitable known construction for encoding and decoding, multiplexing and demultiplexing, amplifying and otherwise processing the signals for transmission to and reception by the surface equipment 24. Appropriate circuits are described, for example, in U.S. Pat. No. 4,012,712 to Nelligan.

The operation of the sonde 10 is controlled by signals sent downhole from a master programmer 48, located in the surface equipment 24. These signals are received by a tool programmer 50 which transmits control signals to the neutron source 26 and the pulse height analyzer 40. In addition, the sonde 10 may contain a temperature sensor 52 which may be used to compensate the measurements from the sonde 10 for the temperature of the borehole fluids 18.

The surface equipment includes the various electronic circuits used in accord with the present invention. These circuits may comprise special purpose hardware as shown in FIG. 2, or alternatively a general purpose computer appropriately programmed to perform the same tasks as such hardware.

Figure 2:
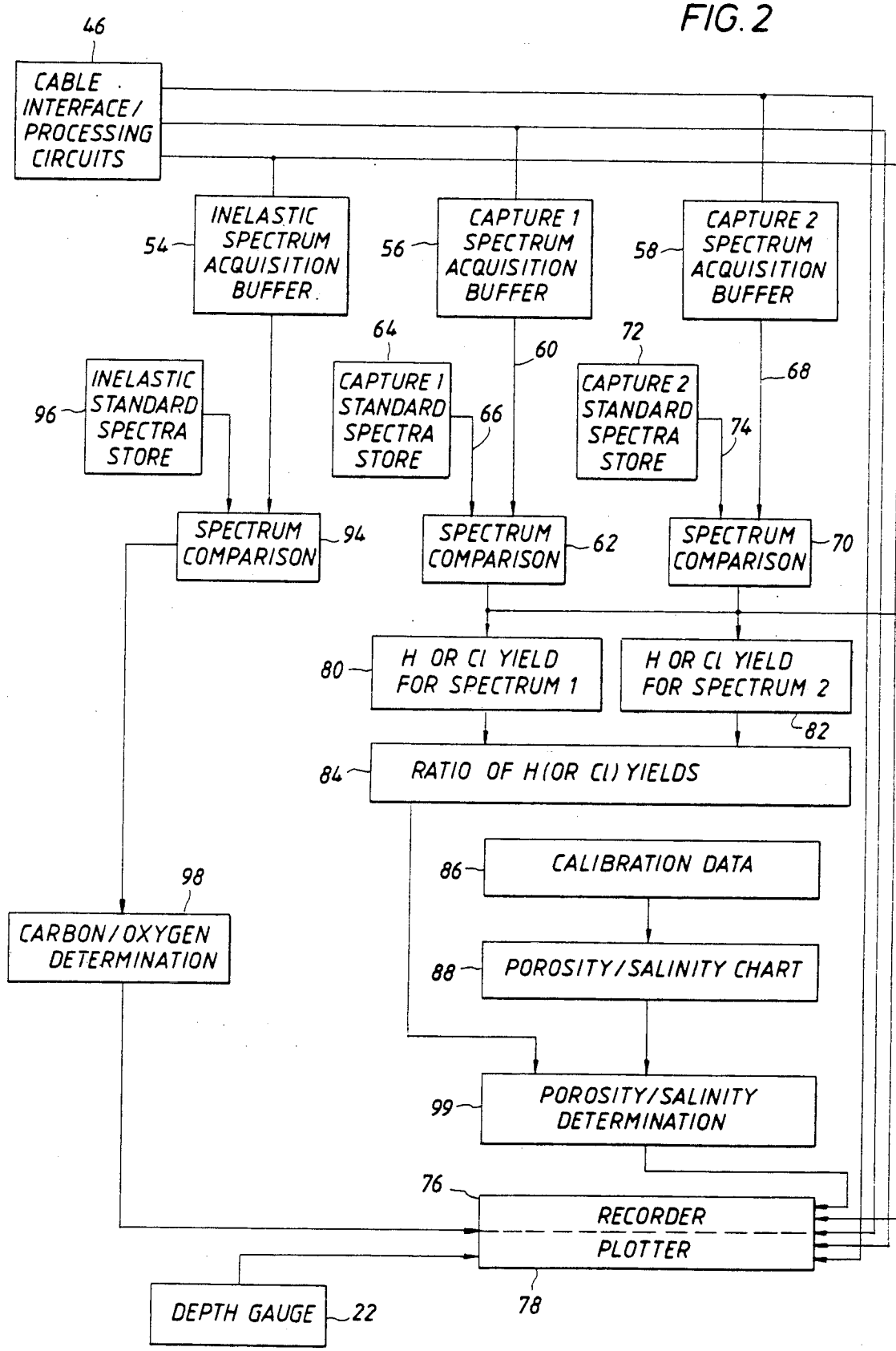
FIG. 2 is a schematic diagram of surface equipment forming part of the apparatus of FIG. 1.

Referring to FIG. 2, the cable interface and signal processing circuits 46 suitably decode the information received from the well logging sonde 10 and transmit this information for the time gates $T_1$, $T_3$, $T_4$ and $T_6$, to respectively, an inelastic spectrum acquisition buffer 54, a first capture spectrum acquisition buffer 56 and a second capture spectrum acquisition buffer 58. A background spectrum acquisition buffer is also provided although not shown, being known per se. Spectral data from the first capture spectrum acquisition buffer 56 is supplied via line 60 to a spectrum comparison circuit 62, which also receives data corresponding to spectral standards from a first capture standard spectra store 64 via a line 66. These standard spectra may be determined in the laboratory and include spectra for the anticipated constituents of the formation 16 and the borehole 12. Typically these constituents are elements, but they may also include more complex materials, such as compounds known to occur in the borehole 12 and/or the formation 16. More details concerning the circuits referred to in connection with FIG. 2 can be found in U.S. Pat. No. 3,521,064 to Moran et al which is herein incorporated by reference. A weighted superimposition of the elemental standard spectra which best matches the detected spectral data from the buffer 56 is derived by the comparison circuit 62, for example by means of a least squares fitting technique, to determine the contribution $E_k$ of each constituent "k" to the observed spectrum. The weightings or coefficients $E_k$ thus derived are output by the spectrum comparison circuit 62 to indicate the constituents of the formation 16 and of the borehole.

Likewise, information in the second capture spectrum acquisition buffer 58 passes over a line 68 to another spectrum comparison circuit 70, where the information is compared with second capture standard spectra supplied from a store 72 over a line 74. These second capture standard spectra may also be determined in the laboratory to correspond to the $T_5$ time gate and include spectra for those constituents that may be expected to appear in the formation 16 and borehole 12. The comparison circuit 70 provides output signals $E_n$ indicative of the relative gamma ray yields of formation constituents "n" contributing to the second capture gamma spectrum. Those skilled in the art will appreciate that correction of the detected spectra for dead time losses before comparison may be desirable to obtain maximum accuracy.

The constituent weightings $E_k$ and $E_n$ determined by the comparison circuits 62 and 70 are recorded by a recording device 76, along with the background, inelastic, first and second capture spectra received from the sonde 10 via the interface and processing circuits 46, and the depth signals provided by the depth gauge 22. The data can also be supplied to drive a plotter 78 to provide a graphical presentation of the derived constituents as a function of the borehole depth.

Figure 4:
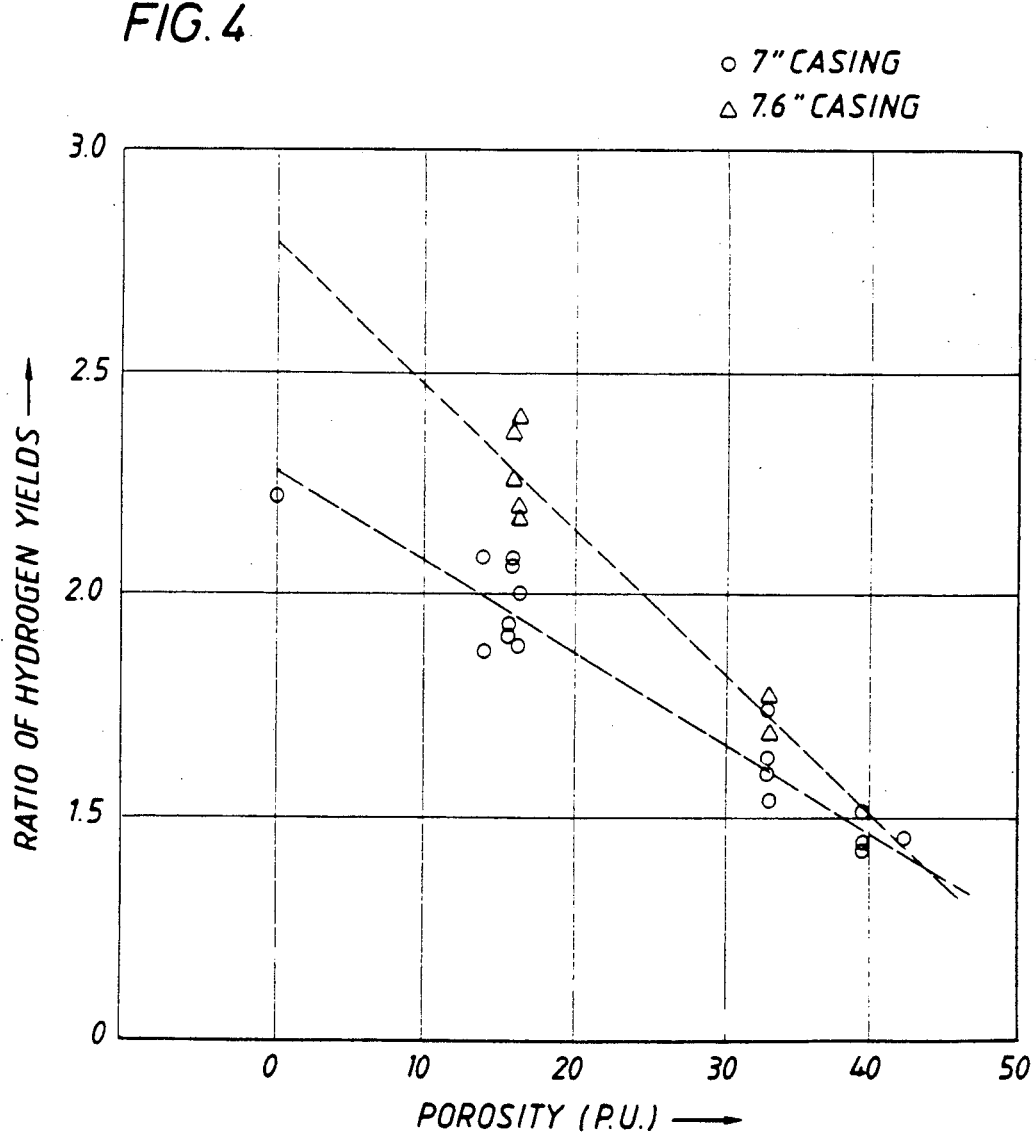
FIG. 4 is a plot of hydrogen yields ratio versus porosity.

Data from comparison circuits 62 and 70 are input respectively in circuits 80 and 82 which respectively generate hydrogen yields ($H_1$, $H_2$) for each of the time gates $T_3$ and $T_6$. The hydrogen yields are input in a circuit 84 designed to combine the hydrogen yields from the respective spectra, according to a predetermined function or relationship. By way of example, such function could be the ratio $H_1/H_2$ or alternately of the type: $(aH_1 + bH_2)/(cH_1 - dH_2)$, where a, b, c and d are coefficients. Hereafter, the function or relationship will be referred to as the ratio, for the sake of simplicity. The ratio is input in a porosity/salinity determination circuit 99 itself linked to recorder/plotter 76, 78. Calibration data, e.g. being derived from laboratory measurements where the response of the sonde is determined in a given environment formation/borehole, are stored in a memory 86. Calibration data are input in a circuit 88 called porosity/salinity chart, and which is designed to generate a chart or a series of plots or curves showing the variations of the hydrogen yields versus the porosity, in different configurations. FIG. 4 shows an example of such plots for two different casing sizes. Circuit 99 is able to determine the porosity value from the hydrogen yields ratio, by using the chart issued from circuit 88. By way of example, if the ratio, as calculated in circuit 84, is equal to 2, the porosity is equal to 12, according to the example of FIG. 4. Similar chart or plot can be made for salinity and used in the manner hereabove described.

In addition, the inelastic spectrum acquisition buffer circuit 54 transmits information to a spectrum comparison circuit 94 which compares the information with standard inelastic spectra data stored in store 96. This comparison circuit operates similarly to the comparison circuits 62 and 70 to derive gamma ray yields of borehole and formation constituents, including elements such as oxygen and carbon, as calculated in circuit 98, which are not determinable with the capture spectra but which are useful in the analysis of the formation 16. Circuit 98 is known in the art and an example of implementation can be found in U.S. Pat. No. 4,937,446 to Roscoe, Stoller and McKeon, assigned to the assignee of the present application and hereby incorporated by reference.

Figure 5:
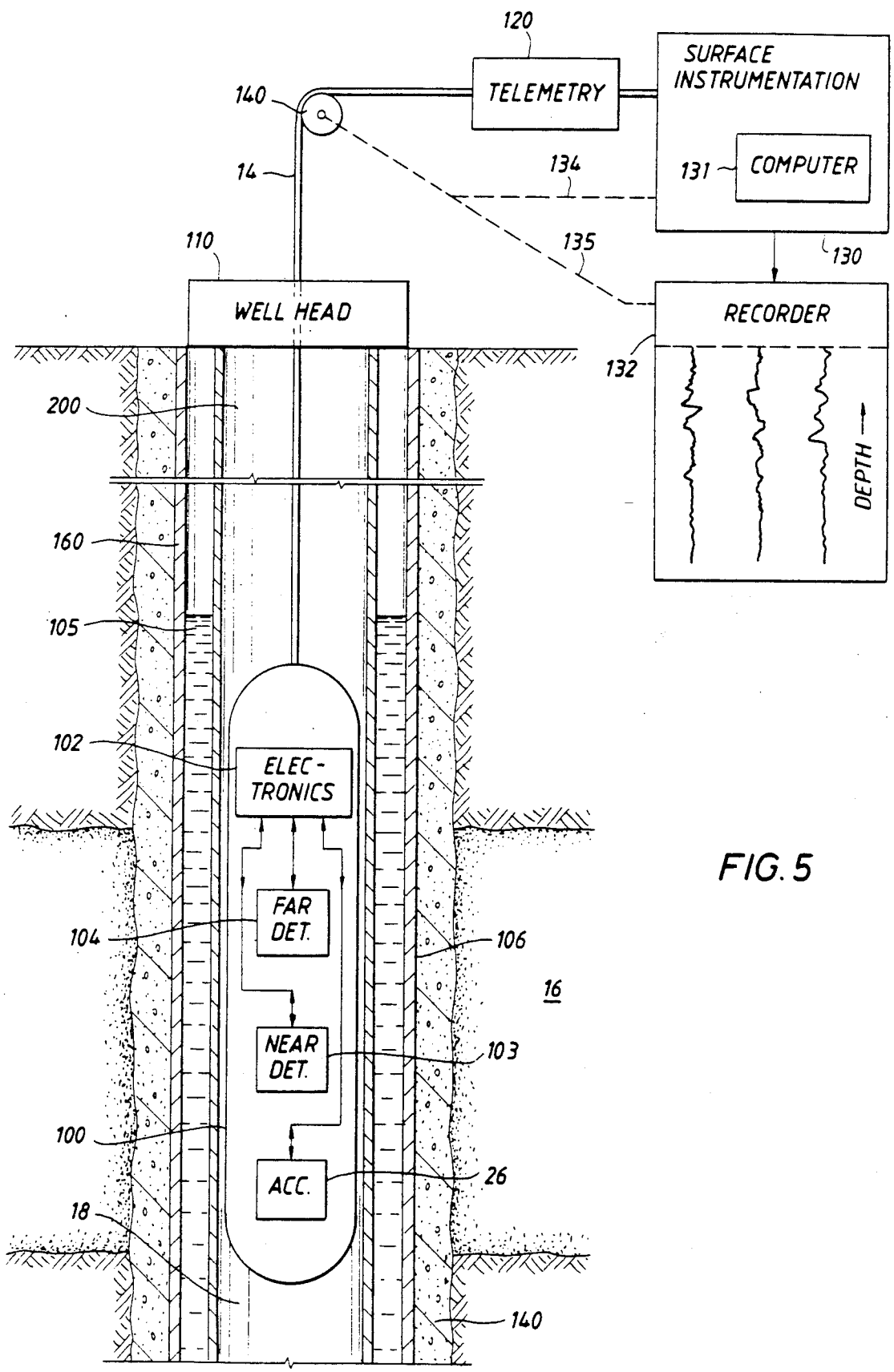
FIG. 5 is a schematic view of a second embodiment of a logging apparatus according to the invention.

In FIG. 5 is described an alternative embodiment of a sonde according to the invention, and where elements similar to those of FIG. 1 bear the same numeral reference.

A sonde 100 is lowered via a cable 14 in a borehole 200 drilled in earth formation 16. A casing 160 is disposed inside borehole 200 as well as cement 140 fills in the annular space between casing 160 and the borehole wall. A tubing 106 coaxial to casing 160 is provided in borehole 200. The annular space separating casing 160 and tubing 106 is filled with fluid 105. Inside the sonde 100 are disposed a neutron source 26, a near gamma ray detector 103 and a far gamma ray detector 104, and an electronic cartridge 102 designed to perform the control, synchronization, data pre-processing & transmission and other operations necessary to the functioning of the sonde. The high energy neutron source 26 in the sonde of FIG. 5 could be either of the electronic type or of the chemical type. In case the source is of the electronic type, it could be operated either to deliver bursts of neutrons or to emit neutrons continuously. By way of illustration, the near and far detectors 103, 104 are spaced from the neutron source 26 respectively by 4 to 12 inches (i.e. about 10 to 30.5 cm) and 12 to 36 inches (i.e. about 30.5 to 91.5 cm). At the surface, the top of borehole 200 is covered by a well head 110, and cable 14, which engages a sheave wheel 140, links the sonde 100 to a telemetry system 120 itself connected to a surface instrumentation 130 including a computer for processing the data coming from the sonde as well as controlling and actuating the different elements at the surface and inside the sonde. The sheave wheel 140 is associated with a device, not shown and known by itself, for measuring the depth of the sonde in the borehole. Such depth measuring device is linked to the surface instrumentation system 130 and to recorder 132 respectively through connections 134 and 135. Data processed by computer 131 are recorded as a function of depth in recorder 132 via connections 134 and 135 to sheave wheel 140.

As it is known in the art, the sonde 100 perform the detection of gamma rays resulting from the capture of thermal neutrons by nuclei of the formation, in order to derive, from the gamma ray counts, the porosity of the formation.

According to the invention, the sonde 100 comprises means for correcting the porosity measurements for the effects of the borehole. The neutron source 26 is operated either to emit continuously neutrons or to provide a burst of neutrons periodically; typically, 20 ms bursts occur in a 100 ms cycle time. A first gate ($T_1$), substantially coinciding with the neutron burst, is used to detect inelastic gamma rays, while a second gate and optionally a third gate may be used to detect capture gamma rays. The inelastic spectra and capture spectra are obtained by accumulating the counts-per-channel signals from the near and far detectors for a period long enough (a few seconds) to give a statistically satisfactory spectrum. This is done under control of surface instrumentation 130, which, after having output the above mentioned spectra, is recycled to zero, and new channel count data for spectra for a new depth in the borehole 200 are accumulated. For each gamma ray detector, measured amounts of elements of the formation and borehole are determined from a composite spectrum made up of weighted standard spectra of the constituents postulated to comprise the formation and the borehole. As hereabove described in connection with FIG. 1, the weights for the standard spectra which give the best fit of the composite spectrum to the unknown spectrum represent the relative proportions of the constituents postulated to be present in the formation and in the borehole. In a manner similar to the method depicted in relation with FIG. 1, one determines the hydrogen yield for the near detector 103 as well as the hydrogen yield for the far detector 104. Then, the ratio (or any other function) of the two hydrogen yields for the near and far detectors is calculated. From the ratio is derived a correction factor to be applied to the porosity measurements in order to take in account the effect of the borehole on the measurements. As a matter of fact, capture gamma rays reaching the near and the far detectors are coming from respective zones situated at different radial distances from the center of the borehole. In other words, the near detector will be influenced by the borehole to a greater extent than the far detector.

The method hereabove described in connection with FIG. 5 can be applied, according to an alternative embodiment, to measurements of the salinity of the water in formation, through the determination of the yields of chlorine and the ratio of the chlorine yields for the near and the far detectors.

It has to be born in mind that both implementations, shown in FIGS. 1–5, relate to the correction of, indifferently, porosity measurements (through the use of hydrogen yields) or salinity measurements (by using chlorine yields).

The respective first (FIGS. 1–4) and second (FIG. 5) implementations above described, are based on the same principle, i.e. using a differential response from atoms of a single element (either hydrogen or chlorine) located at different radial distances of investigation. The differentiation is carried out either in time, by using time gates following each a burst (FIGS. 1–4) or in space by using two detectors longitudinally spaced (FIG. 5).

According to further example of implementation of the invention, the tool may combine both differentiation in time and in space. In that case, the tool comprises two gamma ray detectors and the neutron source is operated to deliver neutron bursts cyclically. The ratio of the hydrogen yield for the near detector to the hydrogen yield for the far detector is calculated. The ratio of hydrogen yields from the two respective time gates (following the respective bursts) is calculated as well. The two ratios are then combined in order to improve the determination of the correction factor to bring to the porosity measurements for taking in account the effect of the borehole. Alternately, in the application of salinity measurements, instead of the hydrogen yields, chlorine yields could be determined and the ratio calculated in a similar manner.

The invention also contemplates a method and a logging tool for correcting for the effect of borehole in measurements for lithology determination. Such measurements are carried out in case iron is present in the borehole, i.e. by way of example in the form of casing, the tool itself or hematite mud. An example of a method and tool for lithology measurements is shown in U.S. Pat. No. 4,810,876 to Wraight et al. or in the SPE paper already referred to. Such tool is designed to determine lithology elements such as e.g. Si, Ca, Fe, S, H, Cl, Gd, Ti or K.

The correction for the effect of borehole in lithology measurements, according to the invention, is also based on the differential response of atoms of a single element situated at different radial distances. The different responses are carried out by using either two longitudinally spaced detectors or by using two neutron bursts of different durations. The logging tool for implementing this embodiment could be based on either logging tools hereabove described and in connection with U.S. Pat. No. 4,788,424 already referred to. The single element the differential response of which is at stake, may e.g. iron. The ratio of iron yields from the near and the far detectors are calculated, and from the ratio is derived a correction factor, in the way hereabove described (see FIG. 5). Alternately, one calculates the ratio of iron yields from two time gates following the respective neutron bursts (see FIGS. 1-4). Iron yield determined from the signal representative of the borehole (i.e. short burst or near detector) will be issued mainly, if not totally, by the tool itself and/or the casing. Thus, the present implementation (based on iron yields) aims at correcting the lithology measurements for the effect of the tool itself and/or the casing. In an alternative embodiment, one could use other elements, such as sodium or- potassium, or any other element which is present both in the formation and in the borehole.

The invention brings a substantial improvement over the correcting methods of the prior art since the correction data are derived from measurements made at different distances radially spaced from the tool. This allows to enhance the difference between the signals representative respectively of the borehole and the formation.

Also, more than two responses could be generated either by using three or more detectors (instead of two), or by using three or more time gates (instead of two), then deriving the hydrogen yields for those detectors or time gates, and generating a relationship between the three or more yields.

What is claimed is:

1. A method for correcting nuclear measurements generated from the detection of gamma rays resulting from the interactions of neutrons with atoms of earth formation traversed by a borehole, for the effect of said borehole, comprising:
   irradiating said formation with neutrons from a high energy neutron source;
   detecting and counting the gamma rays resulting from the capture of said neutrons by atoms of said formation and borehole;
   forming at least two energy spectra representative of gamma rays coming from at least two respective zones radially spaced from said source;
   deriving from each spectrum a response of atoms of a same element located at said respective zones, a first response being mainly representative of the borehole and a second response being mainly representative of the formation;
   combining according to a predetermined relationship said responses; and
   generating from said relationship and from calibration data, a correction for borehole effects to be applied to said measurements.

2. The method according to claim 1 wherein each of said responses comprises the elemental yield of said element.

3. The method according to claim 1 wherein said element is hydrogen and said measurements are porosity measurements.

4. The method according to claim 1 wherein said element is chlorine and said measurements are salinity measurements.

5. The method according to claim 1 wherein said element is iron and said measurements are lithology measurements.

6. The method according to claim 1 wherein said relationship comprises the ratio of said responses.

7. The method according to claim 1 wherein said neutron source is operated to generate cyclically successive neutron bursts, and wherein said responses are derived from gamma rays detected during at least two respective detection time gates, each time gate following a neutron burst.

8. The method according to claim 7 wherein the time interval between said first detection time gate and said first burst is shorter than the time interval between said second detection time gate and said second burst.

9. The method according to claim 7 wherein said bursts are of unequal durations.

10. The method according to claim 7 wherein said first burst lasts between 5 ms and 60 ms, and said second burst lasts between 5 ms and 500 ms.

11. The method according to claim 7 wherein said first detection time gate lasts between 10 ms and 500 ms, and said detection second time gate lasts between 10 ms and 1000 ms.

12. The method according to claim 1 wherein said first responses are derived from gamma rays detected at different detecting locations longitudinally spaced from said neutron source.

13. The method according to claim 12 wherein said detecting locations are spaced from said source respectively between 4 and 12 inches and 12 and 36 inches.

14. The method according to claim 12 wherein said source is operated to emit neutrons continuously.

15. The method according to claim 1, comprising:
   actuating said neutron source to generate cyclically bursts of neutrons;
   detecting and counting said gamma rays at two detecting locations longitudinally spaced from said source;
   combining according to a predetermined relationship the respective differential responses for each detecting locations;
   combining according to said relationship the respective differential responses for the gamma rays detected in respective time gates, each time gate following one burst;
   combining said first and second relationships to provide an improved relationship.

16. A method for determining characteristic or parameter of earth formation traversed by a borehole, corrected for the effect of said borehole, comprising:

irradiating said formation with neutrons from a high energy neutron source;

detecting and counting the gamma rays resulting from the capture of said neutrons by atoms of said formation and borehole;

forming at least two energy spectra representative of gamma rays coming from at least two respective zones radially spaced from said source;

deriving from each spectrum a response of atoms of a same element located at said respective zones, a first response being mainly representative of the borehole and a second response being mainly representative of the formation;

combining according to a predetermined relationship said responses;

establishing from pre-existing calibration data a chart showing the variation of said relationship versus said characteristic to be measured; and deriving from said relationship and from said chart, said characteristic, as corrected for the effect of said borehole.

17. An apparatus for correcting nuclear measurements generated from the detection of gamma rays resulting from the interactions of neutrons with of earth formation traversed by a borehole, for the effect of said borehole, comprising:

means for irradiating said formation with neutrons from a high energy neutron source;

means for detecting and counting the gamma rays resulting from the capture of said neutrons by atoms of said formation and borehole;

means for forming at least two energy spectra representative of gamma rays coming from at least two respective zones radially spaced from said source;

means for deriving from each spectrum a response of atoms of a same element located at said respective zones, a first response being mainly representative of the borehole and a second response being mainly representative of the formation;

means for combining according to a predetermined relationship said responses; and means for deriving from said relationship and from calibration data, a corrective factor for borehole effects to be applied to said measurements.

18. The apparatus according to claim 17 wherein each of said responses comprises the elemental yield of said element.

19. The apparatus according to claim 17 wherein said element is hydrogen and said measurements are porosity measurements.

20. The apparatus according to claim 17 wherein said element is chlorine and said measurements are salinity measurements.

21. The apparatus according to claim 17 wherein said element is iron and said measurements are lithology measurements.

22. The apparatus according to claim 17 wherein said relationship comprises the ratio of said responses.

23. The apparatus according to claim 17 wherein said neutron source is operated to generate cyclically successive neutron bursts, and wherein said responses are derived from gamma rays detected during at least two respective detection time gates, each time gate following a neutron burst.

24. The apparatus according to claim 23 wherein the time interval between said first detection time gate and said first burst is longer than the time interval between said second detection time gate and said second burst.

25. The apparatus according to claim 23 wherein said bursts are of unequal durations.

26. The apparatus according to claim 23 wherein said first burst lasts between 5 ms and 60 ms, and said second burst lasts between 5 ms and 500 ms.

27. The apparatus according to claim 23 wherein said first detection time gate lasts between 10 ms and 500 ms, and said detection second time gate lasts between 10 ms and 1000 ms.

28. The apparatus according to claim 17 wherein said responses are derived from gamma rays detected at different detecting locations longitudinally spaced from said neutron source.

29. The apparatus according to claim 28 wherein said detecting locations are spaced from said source respectively between 4 and 12 inches and 12 and 36 inches.

30. The apparatus according claim 28 wherein said source is operated to emit neutrons continuously.

31. The apparatus according to claim 17, comprising:
means for actuating said neutron source to generate cyclically bursts of neutrons;

means for detecting and counting said gamma rays at two detecting locations longitudinally spaced from said source;

means for combining according to a predetermined relationship the respective differential responses for each detecting locations;

means for combining according to said relationship the respective differential responses for the gamma rays detected in respective time gates, each time gate following one burst;

means for combining said first and second relationships to provide an improved relationship.

32. An apparatus for determining a characteristic or parameter of earth formation traversed by a borehole, corrected for the effect of said borehole, comprising:

means for irradiating said formation with neutrons from a high energy neutron source;

means for detecting and counting the gamma rays resulting from the capture of said neutrons by atoms of said formation and borehole;

means for forming at least two energy spectra representative of gamma rays coming from at least two respective zones radially spaced from said source;

means for deriving from each spectrum a response of atoms of a same element located at said respective zones, a first response being mainly representative of the borehole and a second response being mainly representative of the formation;

means for combining according to a predetermined relationship said responses;

means for establishing from pre-existing calibration data a chart showing the variation of said relationship versus said characteristic to be measured; and means for deriving from said relationship and from said chart, said characteristic, as corrected for the effect of said borehole.

* * * * *